United States Patent
Matti et al.

(10) Patent No.: US 8,280,374 B2
(45) Date of Patent: Oct. 2, 2012

(54) POLICY MANAGEMENT IN A ROAMING OR HANDOVER SCENARIO IN AN IP NETWORK

(75) Inventors: Mona Matti, Nacka (SE); Tony Larsson, Väsby (SE); Tor Kvernvik, Täby (SE); Mattias Lidström, Stockholm (SE); Niklas Björk, Järfälla (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 912 days.

(21) Appl. No.: 12/376,401

(22) PCT Filed: Jun. 1, 2007

(86) PCT No.: PCT/SE2007/050393
§ 371 (c)(1),
(2), (4) Date: Feb. 4, 2009

(87) PCT Pub. No.: WO2008/016323
PCT Pub. Date: Feb. 7, 2008

(65) Prior Publication Data
US 2010/0263017 A1 Oct. 14, 2010

(30) Foreign Application Priority Data
Aug. 4, 2006 (SE) .................................. 0601647-1

(51) Int. Cl.
*H04L 9/32* (2006.01)
*G06F 15/16* (2006.01)
*H04M 1/66* (2006.01)
*H04W 4/00* (2009.01)
*H04K 1/00* (2006.01)

(52) U.S. Cl. ..................... 455/435.1; 455/410; 455/411; 380/247; 713/168; 709/228

(58) Field of Classification Search .................. 726/1, 4, 726/12; 713/168; 709/228; 455/410, 435.1, 455/411; 380/247
See application file for complete search history.

(56) References Cited

U.S. PATENT DOCUMENTS

| | | | |
|---|---|---|---|
| 2005/0228893 A1* | 10/2005 | Devarapalli et al. | 709/228 |
| 2006/0078119 A1* | 4/2006 | Jee et al. | 380/247 |
| 2006/0203791 A1* | 9/2006 | Carrion-Rodrigo et al. | 370/338 |
| 2007/0037533 A1* | 2/2007 | Bristow | 455/127.1 |

FOREIGN PATENT DOCUMENTS

| | | |
|---|---|---|
| WO | WO 2006/000612 A | 1/2006 |
| WO | WO 2006000612 A1 * | 1/2006 |

* cited by examiner

*Primary Examiner* — Jinsong Hu
*Assistant Examiner* — Opiribo Georgewill

(57) ABSTRACT

The invention comprises methods and arrangements for Policy Decision Point discovery in a roaming or handover scenario in an IP network (IN) comprising a plurality of network elements. The authentication function, e.g. an AAA-server, receives the address (ASPDP1) of the serving Policy Decision Point (SPDP1) associated to the user equipment, and stores the address of the serving policy decision point together with the local address of the user equipment. The authentication function sends the address of the serving policy Decision Point to the Home Agent so that the Home Agent can forward the address of the serving policy decision point to the anchor Policy Decision Point and so that the anchor Policy Decision Point can contact the serving policy decision point by using said address of the serving Policy Decision Point.

10 Claims, 3 Drawing Sheets

POLICY MANAGEMENT IN A ROAMING OR HANDOVER SCENARIO IN AN IP NETWORK

TECHNICAL FIELD

The present invention relates to policy management in an IP network. In more detail it relates to policy management in the case of roaming and handover between two Policy Enforcement Points controlled by two different Policy Decision Points.

BACKGROUND

Policy management in an IP network is an important function as the policies indicate essential conditions for the users in the network.

An example of an IP network is IP Multimedia Subsystem (IMS). IMS has been developed by the $3^{rd}$ Generation Partnership Project (3GPP) as an open standard, to give operators of access networks the ability to offer multimedia services in the packet domain. An IMS network can be built above any type of access network and is more or less independent of the access technology used. By using IMS, telecommunications operators can provide services to users irrespective of their location, access technology, and terminal. It also includes a handover of calls between fixed-line and mobile networks.

An important function of IP networks is the enforcement of different policies. These policies dictate e.g. what particular users may and may not do, what they will be charged or what Quality of Service (QoS) a particular user will receive for a specific service. Policies are enforced using policy "rules". A single policy may require a set of policy rules. Policy rules are installed into a node through which all traffic of the users pass or into multiple nodes, which collectively handle all traffic of the user. Common functions in a policy management system are a Policy Enforcement Point (PEP), a Policy Decision Point (PDP) and a subscriber database comprising subscriber/subscription related information.

In 3GPP the PDP functions are handled by the Policy and charging Rules Function (PCRF), the PEP functions are handled by the PCEF located in the GGSN and the subscriber database functions are handled by the Subscription Profile Repository (SPR).

For large IP networks it is common to have several PEPs and several PDPs. Each operator has normally at least one subscriber database for their users. An important function in a case of an IP network is the possibility of roaming and handover between different access points and access networks. Roaming occurs when a user of one service provider or operator uses the facilities of another service provider or operator. Handover normally means the transfer of an ongoing call or data session from one channel connected to the network to another.

From a policy management point of view a Mobile Terminal access the IP network via a PEP which is associated to a specific PDP, which controls the PEP.

For e.g. reasons of scalability, each operator could have several PDP in his network. It is also possible that an operator has a specific PDP for a certain access, e.g. one PDP for 3GPP access and another one for WiMAx access. If a visited network or a home network comprises several PDPs there is no solution today that can handle the policy management in roaming and handover between different PEPs.

In 3GPP R7 a mobile terminal accesses the IP network via a PCEF, a PEP, and the IP address of the subscriber will be associated to a PCRF, a PDP, which controls to the PCEF. If the IP Connectivity Access Network (IP-CAN) is GPRS the appropriate PCRF could be contacted based on which Access Point Name (APN) the mobile terminal is connected to. It is also possible to use the IP address to choose the appropriate PCRF.

For other IP-CANs the Gateway shall contact the appropriate PCRF based on the access point the mobile terminal is connected to and, optionally, a mobile terminal identity information that is applicable for that IP-CAN. In the case of GPRS the mapping from a certain user equipment identity and/or access point name to the PCRF is typically stored in pre-configured tables in the GGSN, the PCEF and the AF.

If there is a plurality of PCRFs in a network the policy management will not work properly. If the mobile terminal has the possibility to access the network via different access points and access networks controlled by different PDPs, different nodes associated to the mobile terminal does not know which PDP that controls the policy management of a mobile terminal.

Other architectures have similar functions as the PCRF, e.g. TISPAN, WiMax Forum, DSL Forum and PacketCable. They also have similar solutions to associate an end-user to a specific PDP.

SUMMARY

To make it possible for the policy management to work in an IP network comprising a plurality of Policy Decision Points (PDP) the network needs to set up connection between some of the policy management functions. The invention uses the communication in the authentication procedure to deliver the address of one policy decision point to another so that they can start a communication. The invention comprises an arrangement and a method suitable for Policy Decision Point discovery in a roaming or handover scenario in an IP network (IN). The IP network comprises user equipment which is assigned a local IP address. Further the network comprises a plurality of Policy Enforcement Points including a serving Policy Enforcement Point associated to the user equipment. It also comprises a plurality of Policy Decision Points including a serving Policy Decision Point associated to the user equipment and the serving Policy Enforcement Point. There is an authentication function and a home agent associated to the user equipment.

The authentication function receives and stores the local IP address of the user equipment and discovers the address of the Home Agent. The address of the home agent is send to the user equipment and the local IP address of the User equipment is sent to the Home Agent so that the Home Agent can assign a home IP address to the user equipment and associate an anchor Policy Decision Point to the user equipment and so that the Home Agent can send the local IP address of the User Equipment to the anchor Policy Decision Point where said anchor Policy Decision Point has access to both Policy Rules and a subscriber database (120) comprising policy information related to the user equipment.

According to the invention the authentication function receives the address (ASPDP1) of the serving Policy Decision Point (SPDP1) associated to the user equipment, and stores the address of the serving policy decision point together with the local address of the user equipment. The authentication function sends the address of the serving policy Decision Point to the Home Agent so that the Home Agent can forward the address of the serving policy decision point to the anchor Policy Decision Point and so that the anchor Policy Decision Point can contact the serving policy decision point by using said address of the serving Policy Decision Point.

An advantage with this invention is that it makes it possible to support handover and roaming scenarios between Policy Enforcement Points in a network comprising a plurality of Policy Decision Points.

The invention will now be described more in detail with the aid of preferred embodiments in connection with the enclosed drawings.

DETAILED DESCRIPTION

Figure 1:
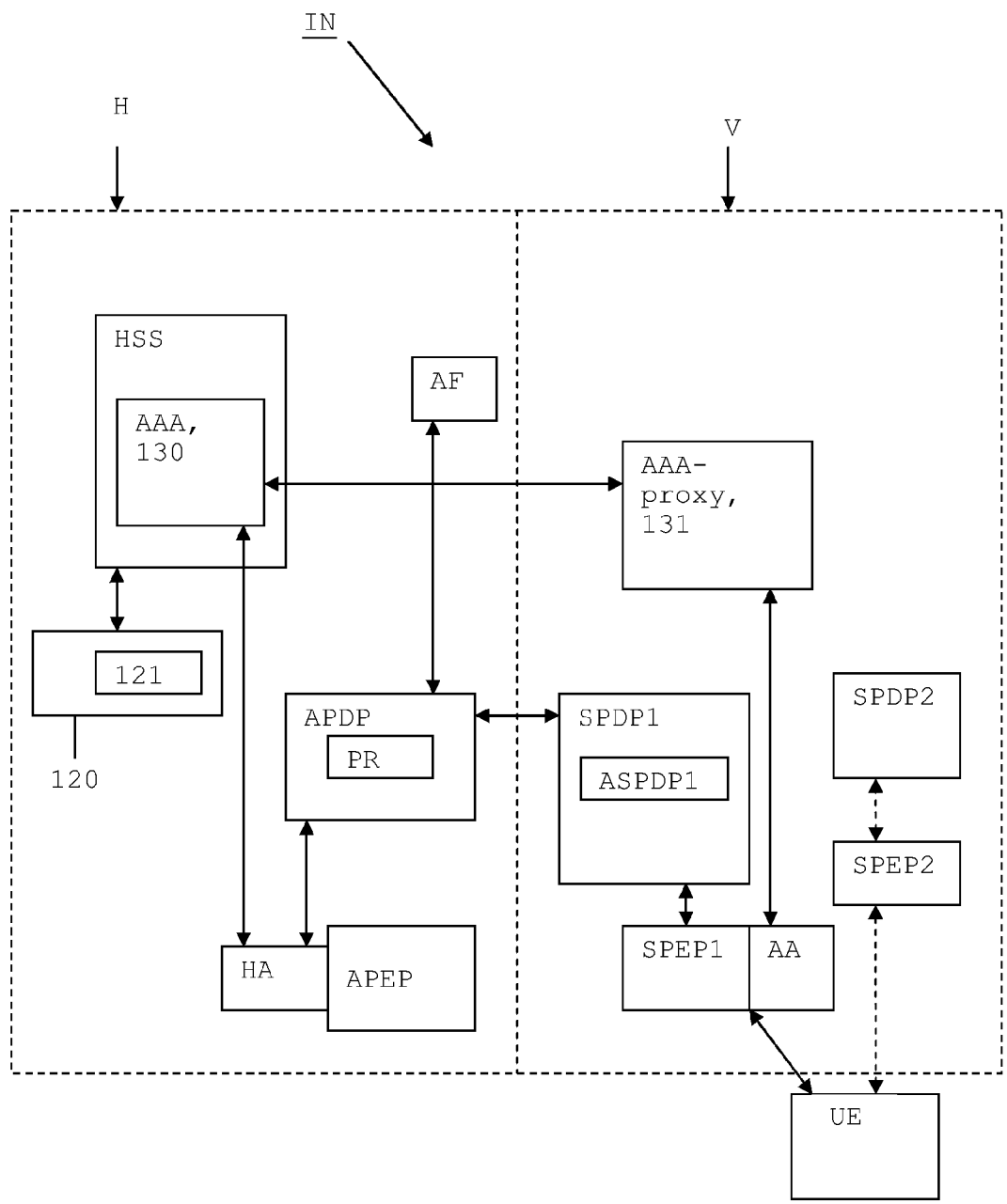
FIG. 1 is a block diagram to illustrate one embodiment of the invention in a roaming scenario.

FIG. 1 illustrates an IP network IN comprising a User Equipment 110, a subscriber database 120 comprising policy related subscriber data 121, policy rules PR, an Anchor Policy Decision Point AFDP, Serving Policy Decision Points SPDP1, SPDP2, an Anchor Policy Enforcement Point APEP, Serving Policy Enforcement Points SPEP1, SPEP2, an application function AF, an AAA server AAA comprising an authorisation function 130, an AAA proxy 131, an authorisation agent AA and a Home Agent HA. The address of the Serving Policy Decision Point SPDP1 is ASPDP1. A user equipment UE is attached to the network. The AAA server can be integrated with the HSS server.

A Policy Enforcement Point (PEP) is a function that requests for access to a resource or execution of a service. The PEP requests evaluation of these access/service execution requests to a Policy Decision Point (PDP). The PDP returns its decision to the PEP and the PEP enforces/carries out the decision that is returned by the PDP. The PEP could e.g. block certain types of traffic according to the decision of the PDP or grant access to specific services.

The main task of a Policy Decision Point (PDP) is to evaluate requests addressed to the PEP. It evaluates the request against a policy. The outcome of the policy evaluation is the 'decision' of the PDP. The PDP and the PEP may be implemented as two distinct entities that intercommunicate by means of a protocol.

An example of a PEP and the PDP is the Policy and Charging Rules Enforcement Function (PCEF) and the Policy and Charging Rules Function (PCRF) in 3GPP PCC R7. Critical traffic, e.g. voice, will be controlled by the PCRF.

An Anchor PDP controls the PEP from a policy management point of view and has access to Policy Rules PR and specific policy information for the Mobile Terminal, the Policy related Subscriber Data 121. A Serving PDP is the one that controls the PEP that the mobile terminal is connected to. These PDPs could be situated everywhere in the network, e.g. in the access network, core network or service network.

The Policy Rules could be stored everywhere, e.g. in the different PDPs or in a separate policy database. In this particular embodiment they are stored in the Anchor PDP.

Policy related subscriber data 121, e.g. subscriber class or subscriber services, for a particular user/subscriber 110 are stored in the subscriber database 120. The subscriber database is normally located in the Home network H. Protocol used between the subscriber database and a PDP could be e.g. LDAP. An example of a subscriber database is the Subscription Profile Repository in 3GPP R7.

The Application Function AF is an element offering applications that require the control of IP bearer resources. The Application Function is capable of communicating with the PDP to transfer dynamic service information, which can then be used for selecting the appropriate charging rule and service based local policy by the PDP. One example of an Application Function is the P-CSCF of the IM CN subsystem.

The home agent HA keeps among other things information about the current IP address of the user equipment.

The AAA function refers to protocols and supporting infrastructure for authentication, authorization and accounting (AAA) in IP networks. The purpose of AAA is to verify the identity of the user (authentication), to verify what types of service the user is entitled to (authorization) and to collect data necessary for billing the user for the service (accounting).

An AAA infrastructure consists of logical nodes, or entities, and their mutual peer relations (in terms of security relations and routing entries) that are needed to convey a AAA protocol between the access network that a subscriber is accessing and the home network of the subscriber. A minimal AAA infrastructure consists of an AAA client and a AAA server. This is all that is needed as long as a subscriber only accesses his home network. The AAA client interfaces related functions in the access networks and conveys the necessary data to the AAA server. The AAA server is the entity that actually authenticates and authorizes the subscriber (and informs the AAA client of the result) and compiles the accounting data transferred from the AAA client. When a subscriber is roaming in another network than his home network H operated by another operator, i.e. in a visited network V, then a AAA server is needed in the visited network too. The AAA server in the visited network acts as a AAA proxy or AAA relay agent between the AAA client and the AAA home server. The AAA server in a visited network is referred to as AAA proxy.

A AAA client typically resides in a NAS (Network Access Server) in the access network. The NAS functionality may be located in e.g. a WLAN access point or an access router. A AAA server is typically located in a central location in the network, close to other subscriber management related activities. It could be integrated with a HSS server. An AAA server can act as both a AAA server and a AAA proxy.

The AAA client and possible intermediate AAA servers use information extracted from the user identity in order to route a AAA request to the correct home AAA server (i.e. the AAA server in the user's home network).

One of the protocols used between the entities of an AAA infrastructure is Radius. Diameter is a more advanced successor of Radius. Radius runs on top of UDP. Diameter, on the other hand, runs on top of TCP or SCTP, protected by either IPsec or TLS.

If a mobile user accesses the network via another PEP than the Anchor PEP, e.g. a Serving PEP, SPEP1 in a visiting network, the user is going to be associated to Serving PDP SPDP1, that controls the SPEP1. In this example he attaches to SPEP1 and the SPDP1 assigned.

To be able to enforce the proper policy decisions the SPDP1 and the APDP must communicate with each other. Preferably the APDP discover the SPDP1 and initiate the PDP-PDP interaction. This could be done via the interface S9 mentioned in 3GPP TS 23.203 and TR 23.882. To be able to set up a connection the invention proposes that one of the Policy Decision Points, SPDP1 or APDP, receives the address of the other one. To be able to do this, the invention introduces a method to deliver the address (ASPDP1) of the serving policy decision point to the anchor policy decision point. The method comprises the feature of including this address in the communication of the authorisation procedure of the user equipment.

A first embodiment describes a roaming scenario according to FIG. 1. In a first embodiment the Anchor PDP is situated in the Home operator network H and the Serving PDP, SPDP1, is situated in a visited network V. The Anchor PDP is also connected to an Application Function (AF) situated in the Home network H. The home agent HA is situated in the home network H and the user equipment is connecting to a Policy Enforcement Point, SPEP1, in the visiting network V. The authentication procedure is in this example effectuated by an AAA server. The AAA server can be integrated with the HSS server. The AAA client is used as an authorisation agent AA. There is an AAA proxy in the visited network. The method comprises the following steps.

The user equipment UE starts to attach to the visited network and starts an authentication procedure.

The network provides the UE with a temporary IP-address and assigns a serving policy enforcement point SPEP1 to the UE.

The network assigns a serving policy decision point SPDP1 to the UE and the SPEP1.

The network discovers an AAA-proxy 131 to be associated to the UE.

The authorisation agent AA communicates with the AAA-proxy and sends the address ASPDP1 of the SPDP1 to the AAA-proxy.

The AAA-proxy communicates with an AAA server and includes the address of the SPDP1 to the AAA server.

The AAA server stores the information about the visited domain and the address of the SPDP1, and discovers the Home Agent HA.

The AAA server communicates with the AAA-proxy and sends over authentication successful as well as the address of the HA to the AAA-proxy.

The AAA-proxy forwards the authentication successful and the address of the HA to the UE.

A security association between the UE and the HA starts.

HA communicates with the AAA-server and the AAA-server sends authentication successful, the IP-address of the UE and the address of the SPDP1 to the HA.

HA assigns a home IP-address of the UE and an APDP and sends the address of the SPDP1 and the local IP-address of the UE to the APDP.

The APDP creates a default PCC rule after interaction with the subscriber database 120, initiates a PDP-PDP interface to push rules to the SPDP1.

The SPDP1 starts IP setup using the local IP address and push rules after possible modification to the SPEP1. The session ID can be used to bind local IP address and the home IP address in APDP.

The nodes and functions can be situated in all kind of constellations concerning the home network and the visited network. In e.g. a handover scenario, all the nodes and functions will be situated in the home network. At this particular case there is no need for an AAA proxy 131.

Figure 2:
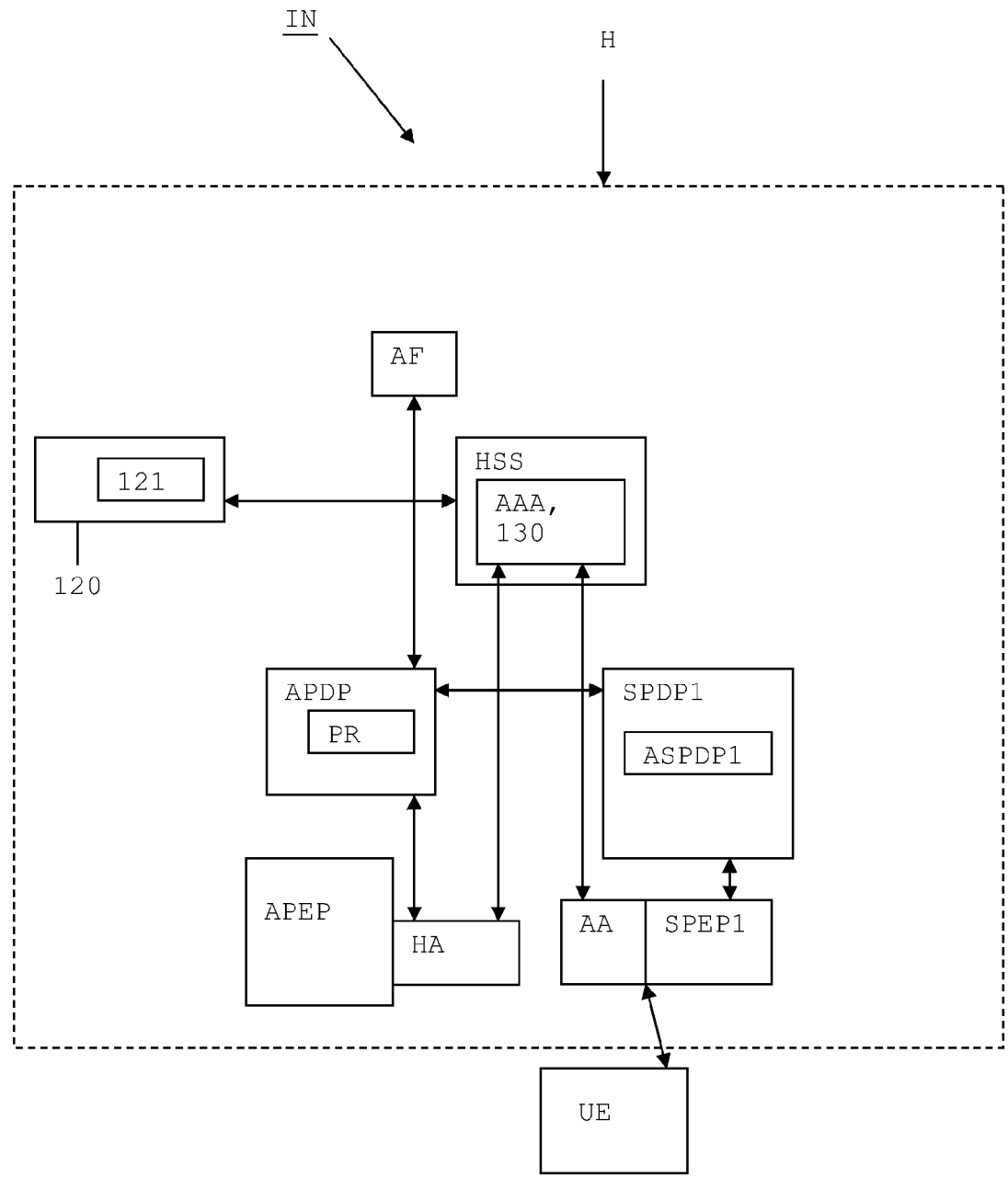
FIG. 2 is a block diagram to illustrate one embodiment of the invention in a handover scenario

A second embodiment describes a handover scenario according to FIG. 2. Both the Anchor PDP, APDP, and the Serving PDP, SPDP1, is situated in a home network H. The Anchor PDP is also connected to an Application Function (AF) situated in the Home network H. The home agent HA is situated in the home network H and the user equipment is connecting to a Policy Enforcement Point, SPEP1 also situated in the home network. The authentication procedure is in this example effectuated by an AAA server. The AAA client is used as an authorisation agent AA. There is no AAA proxy needed in this case. The method comprises the following steps.

The user equipment UE starts to attach to the network and starts an authentication procedure.

The network provides the UE with a temporary IP-address and assigns a serving policy enforcement point SPEP1 to the UE.

The network assigns a serving policy decision point SPDP1 to the UE and the SPEP1.

The network discovers the AAA-server to be associated to the UE.

The authorisation agent AA communicates with the AAA-server and sends the address ASPDP1 of the SPDP1 to the AAA-server.

The AAA server stores the information about the visited domain and the address of the SPDP1, and discovers the Home Agent HA.

The AAA server communicates with UE and sends over authentication successful and the address of the HA to the UE.

A security association between the UE and the HA starts.

HA communicates with the AAA-server and the AAA-server sends authentication successful, the IP-address of the UE and the address of the SPDP1 to the HA.

HA assigns a home IP-address of the UE and an APDP and sends the address of the SPDP1 and the local IP-address of the UE to the APDP.

The APDP creates a default PCC rule after interaction with the subscriber database 120, initiates a PDP-PDP interface to push rules to the SPDP1.

The SPDP1 starts IP setup using the local IP address and push rules after possible modification to the SPEP1. The session ID can be used to bind local IP address and the home IP address in APDP.

Figure 3:
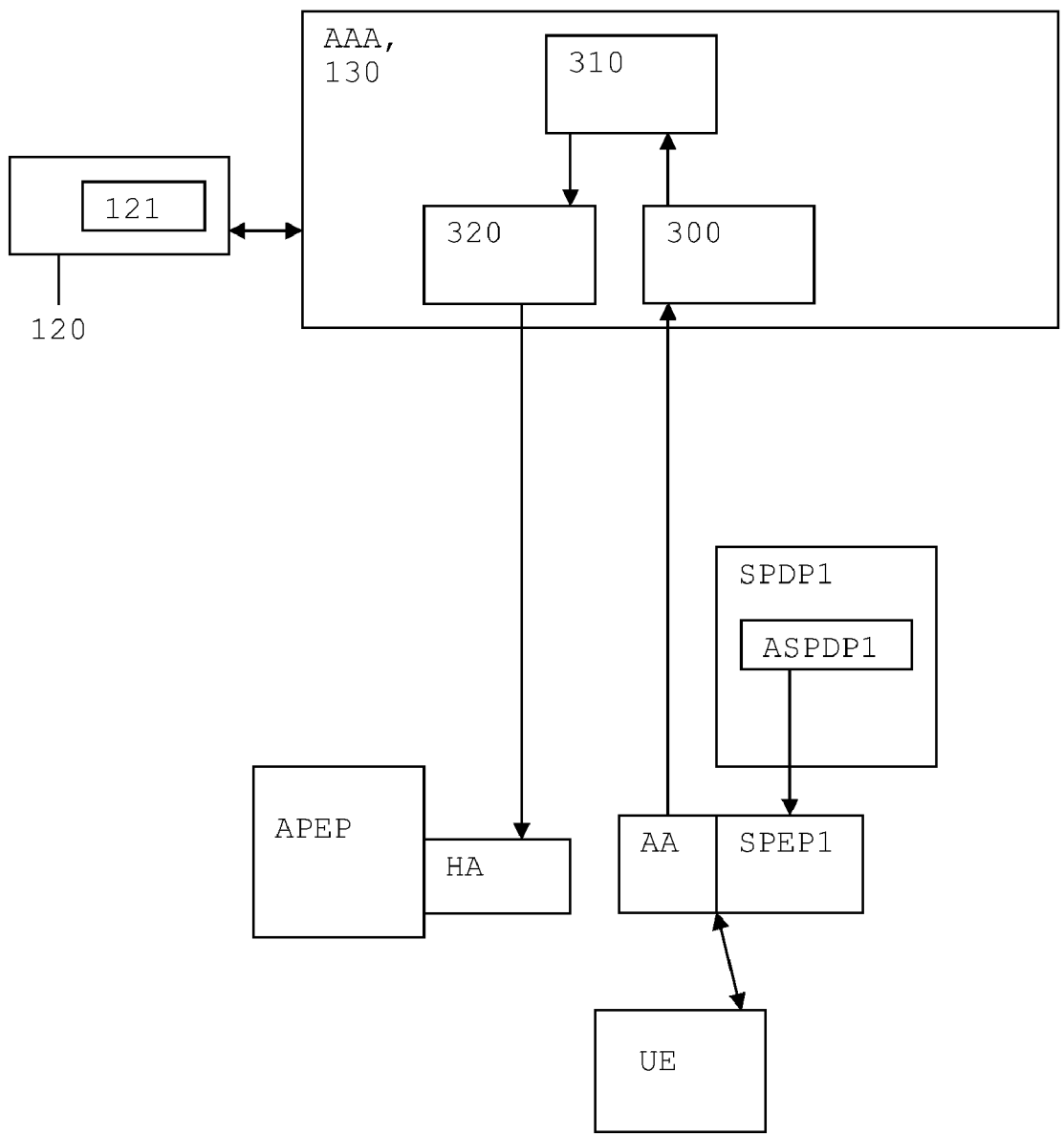
FIG. 3 is a block diagram to illustrate one embodiment of an AAA server according to the invention

FIG. 3 illustrates an AAA server used in the methods described above. It comprises an authentication function 130. The AAA server or the authentication function has means 300 for receiving the address ASPDP1 of the serving Policy Decision Point SPDP1 associated to the user equipment UE, means 310 for storing the address of the serving policy decision point together with the local address of the user equipment and means 320 for sending the address of the serving policy Decision Point to the Home Agent so that the Home Agent can forward the address of the serving policy decision point to the anchor Policy Decision Point.

The invention claimed is:

1. A method suitable for Policy Decision Point discovery in a roaming or handover scenario in an IP network,
the method comprising the steps of:
receiving and storing at an authentication function a local IP address of a user equipment,
discovering an address of a Home Agent,
sending, from the authentication function, the address of the Home Agent to the user equipment,
sending from the authentication function the local IP address of the user equipment to the Home Agent so that the Home Agent can assign a home IP address to the user equipment and associate an anchor Policy Decision Point to the user equipment and so that the Home Agent can send the local IP address of the user equipment to the anchor Policy Decision Point where said anchor Policy Decision Point has access to both Policy Rules and a subscriber database comprising policy information related to the user equipment;

receiving at the authentication function an address of a serving Policy Decision Point associated to the user equipment, storing, at the authentication function, the address of the serving policy decision point together with the local address of the user equipment, sending from the authentication function the address of the serving policy Decision Point to the Home Agent so that the Home Agent can forward the address of the serving policy decision point to the anchor Policy Decision Point and so that the anchor Policy Decision Point can contact the serving policy decision point by using said address of the serving Policy Decision Point.

2. A method according to claim 1 where the authentication function is situated in the home network of the user equipment.

3. A method according to claim 1 where the authentication function is configured to use the Diameter or Radius protocol.

4. A method according to claim 1 where the authentication function is situated in an AAA server.

5. A method according to claim 4 where the communication between the UE and the AAA server is going via an AAA proxy.

6. An authentication function in an IP network, suitable for authentication of a user equipment assigned a local IP address comprising:

means for receiving and storing at the authentication function the local IP address of the user equipment, means for discovering the address of a Home Agent associated to the user equipment, means for sending address of the Home Agent to the user equipment, means for sending the local IP address of the User equipment to the Home Agent so that the Home Agent can assign a home IP address to the user equipment and associate an anchor Policy Decision Point to the user equipment and so that the Home Agent can send the local IP address of the User Equipment to the anchor Policy Decision Point where said anchor Policy Decision Point has access to both Policy Rules and a subscriber database comprising policy information related to the user equipment, means for receiving the address of the serving Policy Decision Point associated to the user equipment UE, means for storing the address of the serving policy decision point together with the local address of the user equipment, means for sending the address of the serving policy Decision Point to the Home Agent so that the Home Agent can forward the address of the serving policy decision point to the anchor Policy Decision Point and so that the anchor Policy Decision Point can contact the serving policy decision point by using said address of the serving Policy Decision Point.

7. An authentication function according to claim 6 where the authentication function is situated in the home network of the user equipment.

8. An authentication function according to claim 6 where the authentication function is configured to use the Diameter or Radius protocol.

9. An authentication function according to claim 6 where the authentication function is situated in an AAA server.

10. An authentication function according to claim 9 where the communication between the UE and the AAA server is going via an AAA proxy.

* * * * *

UNITED STATES PATENT AND TRADEMARK OFFICE
CERTIFICATE OF CORRECTION

| | | |
|---|---|---|
| PATENT NO. | : 8,280,374 B2 | Page 1 of 1 |
| APPLICATION NO. | : 12/376401 | |
| DATED | : October 2, 2012 | |
| INVENTOR(S) | : Matti et al. | |

It is certified that error appears in the above-identified patent and that said Letters Patent is hereby corrected as shown below:

On the Title Page: Item (56), under "FOREIGN PATENT DOCUMENTS", in Column 2, Line 1, delete "WO WO 2006/000612 A 1/2006".

In the Specifications:

In Column 3, Line 24, delete "AFDP," and insert -- APDP, --, therefore.

Signed and Sealed this
Fifth Day of March, 2013

Teresa Stanek Rea
*Acting Director of the United States Patent and Trademark Office*